United States Patent [19]
Kawakami

[11] 4,109,882
[45] Aug. 29, 1978

[54] FISHING REEL DRAG WHEEL

[75] Inventor: Kunio Kawakami, Torrance, Calif.

[73] Assignee: Kencor Sports, Inc., Torrance, Calif.

[21] Appl. No.: 687,401

[22] Filed: May 17, 1976

[51] Int. Cl.² ............................................. A01K 89/02
[52] U.S. Cl. ................................... 242/217; 85/32 W
[58] Field of Search ....................... 242/84.1 R, 84.5 A, 242/84.51 A, 211, 212, 213, 214, 215, 216, 217, 218, 219, 220, 221; 85/32 W

[56] References Cited

U.S. PATENT DOCUMENTS

| 2,168,938 | 8/1939 | Klein | 242/213 |
| 2,383,141 | 8/1945 | Maage, Jr. | 85/32 W |

FOREIGN PATENT DOCUMENTS 550,944  2/1943  United Kingdom ................ 85/32 W Primary Examiner—Billy S. Taylor
Attorney, Agent, or Firm—Fulwider, Patton, Rieber, Lee & Utecht

[57] ABSTRACT

A fishing reel drag wheel of the type rotatable upon the shaft of the reel handle to engage a clutch means and adjust the degree of frictional coupling provided by the clutch means between the shaft and the fishing reel spool. The drag wheel is formed of flat, relatively thin metal plate and is characterized by a plurality of spokes radiating from a central hub portion and terminating in enlarged tab portions. The spokes are twisted through approximately ninety degrees so that the flat faces of the tab portions, rather than their relatively narrow edges, are presented for manipulation by the fisherman.

1 Claim, 4 Drawing Figures

FISHING REEL DRAG WHEEL

BACKGROUND OF THE INVENTION

1. Field of the Invention

The present invention relates to a fishing reel drag wheel of the type which is rotatable by the fisherman to adjust the drag on the fishing reel spool.

2. Description of the Prior Art

It is important in the use of a fishing reel to be able to adjust the drag on the spool. This is accomplished in a typical fishing reel by a clutch mechanism which is coupled between the gearing which drives the spool and the shaft which is rotated by the reel handle. When properly adjusted this will enable the fisherman to rotate the handle and reel in a fish up to a certain resistance level or level of spool drag. Above that level the clutch mechanism permits the spool to slip as the handle is rotating, and also permits the spool to rotate opposite the direction of rotation of the handle if the line strain is great enough.

In most fishing reels control of the operation of the clutch means is accomplished by thumb manipulation of a star or to the handle shaft. By pressing against the ends of radial spokes forming part of the drag wheel, the wheel is rotated on the handle shaft and against the clutch mechanism to adjust the frictional coupling between the handle and the gearing which drives the reel spool.

Reels of this type are very popular in relatively heavy duty tackle such as is used in salt water fishing. Consequently, it is desirable to minimize the weight of such tackle as much as possible, and to make it corrosion resistant. In this regard, the usual drag wheel is made of relatively thick metal in order that the edges of the drag wheel spokes will be sufficiently wide that they can be thumb manipulated without cutting or bruising the fisherman. The metal is treated and usually chrome plated for corrosion resistance. However, the usual chrome plating is often damaged or worn away in a relatively short time. Thus, the drag wheel is relatively heavy for the function it performs and it is susceptible to corrosion.

SUMMARY OF THE INVENTION

According to the present invention, a drag wheel is provided which is formed of flat, relatively thin metal plate, such as corrosion resistant stainless steel, as in the prior art devices, the hub portion is adapted for rotation upon the reel handle shaft to adjust the frictional effect of the clutch mechanism. However, the relatively thin material of the plurality of spokes extending radially of the hub portion are twisted through approximately ninety degrees to dispose the flat extremities or tab portions of the spokes in approximately right angular relation to the plane of the hub portion. Thus, despite the relatively thin material of which the tab portions are made, they present a relatively large surface area for the fisherman to press against. This allows easier, more precise adjustment of the spool drag, and without cutting or bruising the fisherman's hand after many hours of fishing.

Other objects and features of the invention will become apparent from consideration of the following description taken in connection with the accompanying drawings.

DESCRIPTION OF THE PREFERRED EMBODIMENT

Figure 1:
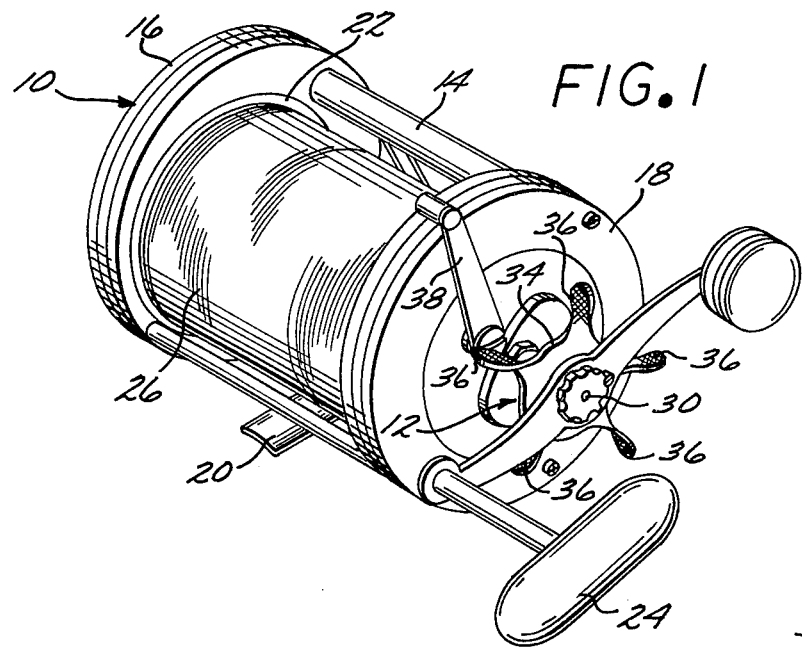
FIG. 1 is a perspective view of a fishing reel including the drag wheel of the present invention.

Referring now to the drawings, there is illustrated a reel 10 of usual and conventional construction except for the star or drag wheel 12, as will be seen.

The usual reel 10 includes a frame 14 having left and right side plates 16 and 18, respectively, and a reel stand 20 for mounting the reel 10 to a fishing rod (not shown). The reel 10 also includes a spool 22 whose opposite ends are rotatably mounted in the plates 16 and 18. Rotation of the spool 22 by means of a handle 24 winds line 26 onto the spool.

Figure 4:
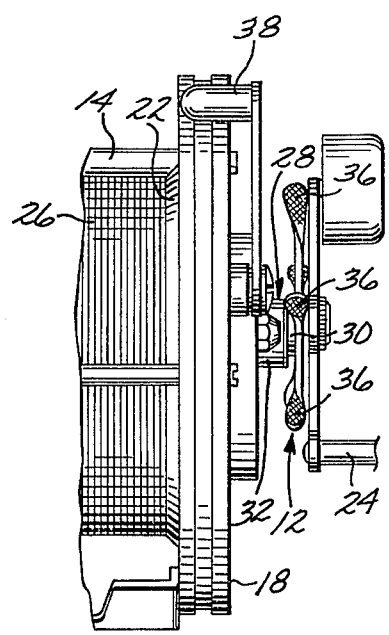
FIG. 4 is a partial side elevational view of the reel of FIG. 1.

Suitable gearing and clutch mechanisms are interposed between the handle 24 and the spool 22 to control the relative rotation therebetween, and particular to adjust the degree of drag on the fishing line necessary to slow rotation of the spool 22 relative to the handle 24. More particularly, as is well known to those skilled in the art, gear means (not shown) are coupled to the spool 22 and are rotatable to rotate the spool 22. A drag or clutch means 28, only partially shown in the drawings, is mounted upon an externally threaded shaft 30 which is rotatable by the handle 24. The clutch means 28 typically includes a plurality of frictionally engageable disks, some of which are keyed to the gear means and some of which are keyed to the shaft 30. When these disks are pressed tightly together, there is common rotation between the shaft 30 and the spool 22. The degree to which they are pressed together determines the degree of relative rotation between the shaft and spool. In the embodiment illustrated the clutch disks are frictionally urged together by inward axial movement of a bushing 32 which is carried by the shaft 30. Such movement is accomplished by the drag wheel 12 whose central hub portion 34 is threadably mounted to the shaft 30. Rotation of the drag wheel 12 away from the viewer, as seen in FIG. 4, threadably advances the drag wheel 12 to the left and thereby axially moves the bushing 32 to the left to increase the frictional effect of the clutch means 28.

Figure 2:
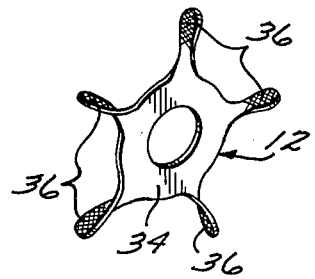
FIG. 2 is an enlarged perspective view of the drag wheel of FIG. 1.
Figure 3:
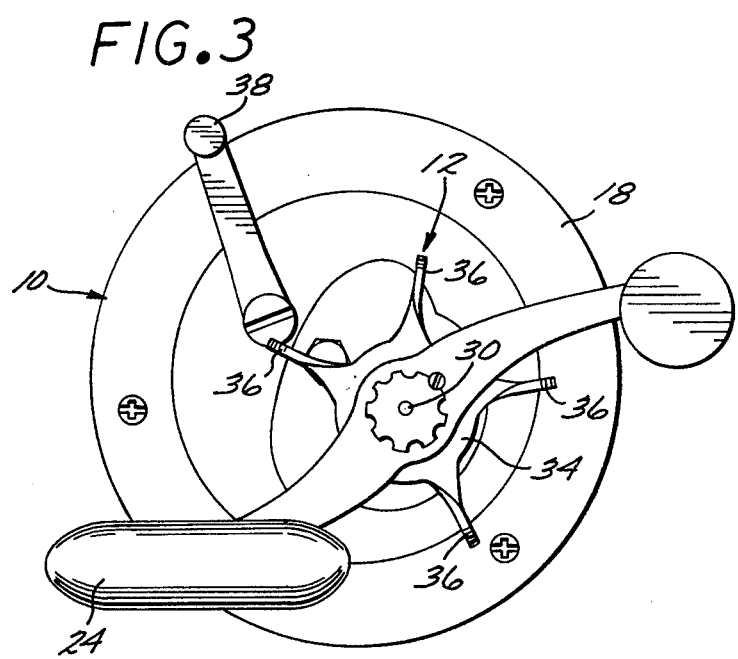
FIG. 3 is an enlarged end elevational view of the reel of FIG. 1.

The drag wheel 12 is formed of flat metal sheet or plate, preferably stainless steel, and the flat face of the hub portion 34 engages the end of the bushing 32. The drag wheel 12 includes a plurality of spokes radiating outwardly of the hub portion 34 and terminating in enlarged tab portions 36. The spokes are twisted approximately ninety degrees to the plane of the hub portion 34, thereby disposing the tab portions 36 in approximately right angular relation to the plane of the hub portion 34. With this arrangement, despite the relatively thin corrosion resistant material of which the tab portions 36 are made, a relatively wide, flat tab area is presented to the fisherman for easy operation and control of the frictional drag on the spool 22. The tab portions are preferably provided with non-slip surfaces, as indicated in FIG. 1, 2 and 4, as by etching or stamping or otherwise forming in the surfaces a grid of intersecting ridges and indentations.

In operation the frictional drag on the spool 22 is adjusted by first flipping a free spool lever 38 to the position illustrated, which renders the clutch means 28 operative to allow rotation of the spool 22 in response to rotation of the handle 24. The drag wheel 12 is then turned away from the viewer, as seen in FIG. 4, until the drag on the spool 22 is sufficient to allow bringing in a fish at acceptable line tension without slipping of the spool. When a fish strikes and pulls on the line strongly enough to overcome the preset drag, and thereby pay out line from the spool, the fisherman can easily slow down rotation of the spool to tire the fish by gradually pressing against the broad flat faces of the tab portions 36.

Various modifications and changes may be made with regard to the foregoing detailed description without departing from the spirit of the invention.

I claim:

1. In a fishing reel having a spool, gear means coupled to said spool and rotatable to rotate said spool, a shaft, a handle mounted to said shaft for rotation of said shaft, and clutch means operative to frictionally couple said gear means and said shaft for rotation of said spool by said handle, the improvement comprising:

a drag wheel formed of flat metal plate and including a flat hub portion rotatable upon said shaft for engagement with and operation of said clutch means to adjust the frictional resistance of said spool to rotation by said handle, said drag wheel further including a plurality of spokes radiating outwardly of said hub portion and terminating in enlarged tap portions having opposite flat faces, said spokes being twisted through approximately 90° relative to said hub portion and thereby disposing said tab portions in approximately right angular relation to the plane of said flat hub portions whereby only said opposite flat faces are normally engaged by the fisherman in rotating said drag wheel in opposite directions.

* * * * *

UNITED STATES PATENT OFFICE
CERTIFICATE OF CORRECTION

Patent No. 4,109,882          Dated Aug. 29, 1978

Inventor(s) KUNIO KAWAKAMI

It is certified that error appears in the above-identified patent and that said Letters Patent are hereby corrected as shown below:

Claim 1, line 14, delete "tap" and insert --tab--;

line 18, delete "portions" and insert

--portion--.

Signed and Sealed this

Twenty-fourth Day of April 1979

[SEAL]

Attest:

RUTH C. MASON
Attesting Officer

DONALD W. BANNER
Commissioner of Patents and Trademarks